US010773954B2

(12) United States Patent
Cesareo et al.

(10) Patent No.: US 10,773,954 B2
(45) Date of Patent: Sep. 15, 2020

(54) CONTINUOUS PROCESS FOR PREPARING PRISTINE GRAPHENE NANOPLATELETS

(71) Applicant: Directa Plus S.P.A., Lomazzo (IT)

(72) Inventors: Giulio Cesareo, Como (IT); Maria Riccardo Parrini, Milan (IT); Laura Giorgia Rizzi, Saronno (IT)

(73) Assignee: Directa Plus S.p.A., Lomazzo (IT)

( * ) Notice: Subject to any disclaimer, the term of this patent is extended or adjusted under 35 U.S.C. 154(b) by 497 days.

(21) Appl. No.: 15/313,183

(22) PCT Filed: Jun. 16, 2015

(86) PCT No.: PCT/EP2015/063397
§ 371 (c)(1),
(2) Date: Nov. 22, 2016

(87) PCT Pub. No.: WO2015/193267
PCT Pub. Date: Dec. 23, 2015

(65) Prior Publication Data
US 2017/0190581 A1 Jul. 6, 2017

(30) Foreign Application Priority Data

Jun. 20, 2014 (IT) ............................... MI2014A1124

(51) Int. Cl.
*B82Y 30/00* (2011.01)
*B01J 19/10* (2006.01)
(Continued)

(52) U.S. Cl.
CPC ............... *B82Y 30/00* (2013.01); *B01J 19/10* (2013.01); *B82Y 40/00* (2013.01); *C01B 32/182* (2017.08);
(Continued)

(58) Field of Classification Search
CPC .......... B82Y 30/00; B82Y 40/00; B01J 19/10; C01B 32/19; C01B 32/184; C01B 32/182;
(Continued)

(56) References Cited

U.S. PATENT DOCUMENTS

| 4,773,833 A | 9/1988 | Wilkinson et al. |
| 8,367,004 B2 | 2/2013 | Panagiotou et al. |

(Continued)

FOREIGN PATENT DOCUMENTS

| EP | 2038209 B1 | 8/2012 |
| KR | 20130082277 A * | 7/2013 |

(Continued)

OTHER PUBLICATIONS

Han et al, "Scalable, printable, surfactant-free graphene ink directly from graphite," Nanotechnology vol. 24 (2013) 205304 (Year: 2013).*

(Continued)

*Primary Examiner* — Nicholas A Smith
*Assistant Examiner* — Colleen M Raphael
(74) *Attorney, Agent, or Firm* — Patterson Intellectual Property Law, P.C.; Gary L. Montle; Ryan D. Levy (57) ABSTRACT

Process for producing pristine graphene nanoplatelets, comprising the expansion of flakes of intercalated graphite and the collection thereof in water with formation of a dispersion in the substantial absence of surfactants, followed by an exfoliation and size reduction treatment carried out using ultrasonication of the aqueous dispersion or using high pressure homogenization thereof in a high shear homogenizer. A dispersion of pristine graphene is obtained in the form of nanoplatelets, at least 90% of which have a lateral size (x, y) from 50 to 50,000 nm and a thickness (z) from 0.34 to 50 nm, having a C/O ratio ≥100:1 and a high electrical conductivity.

7 Claims, 5 Drawing Sheets

(51) Int. Cl.
*C01B 32/19* (2017.01)
*C01B 32/225* (2017.01)
*C01B 32/184* (2017.01)
*B82Y 40/00* (2011.01)
*C01B 32/182* (2017.01)

(52) U.S. Cl.
CPC ............ *C01B 32/184* (2017.08); *C01B 32/19* (2017.08); *C01B 32/225* (2017.08); *C01B 2204/04* (2013.01); *C01B 2204/32* (2013.01)

(58) Field of Classification Search
CPC .............. C01B 32/225; C01B 2204/04; C01B 2204/32
USPC ........................................ 204/157.42, 157.47
See application file for complete search history.

(56) References Cited

U.S. PATENT DOCUMENTS

| | | | | |
|---|---|---|---|---|
| 10,435,837 | B2* | 10/2019 | Cesareo | C01B 32/19 |
| 2002/0054995 | A1 | 5/2002 | Mazurkiewicz | |
| 2008/0206124 | A1* | 8/2008 | Jang | B82Y 30/00 423/415.1 |
| 2008/0279756 | A1 | 11/2008 | Zhamu et al. | |
| 2010/0147188 | A1* | 6/2010 | Mamak | B82Y 30/00 423/448 |
| 2011/0017585 | A1 | 1/2011 | Zhamu et al. | |
| 2011/0300056 | A1 | 12/2011 | Mercuri | |
| 2012/0052301 | A1* | 3/2012 | Linder | B82Y 10/00 428/408 |
| 2013/0102084 | A1* | 4/2013 | Loh | B01J 21/185 204/157.42 |
| 2013/0108540 | A1* | 5/2013 | Baek | B82Y 30/00 977/734 |
| 2013/0264041 | A1 | 10/2013 | Zhamu et al. | |
| 2014/0106153 | A1 | 4/2014 | I-Chiao et al. | |
| 2014/0147648 | A1 | 5/2014 | Zhamu et al. | |
| 2015/0275378 | A1* | 10/2015 | Koo | C25B 1/00 205/615 |
| 2015/0376014 | A1* | 12/2015 | Cesareo | B82Y 30/00 442/86 |
| 2017/0121179 | A1* | 5/2017 | Bepete | C01B 32/19 |

FOREIGN PATENT DOCUMENTS

| | | |
|---|---|---|
| WO | 2009106507 A2 | 9/2009 |
| WO | 2014082008 A1 | 5/2014 |
| WO | 2014135455 A1 | 9/2014 |

OTHER PUBLICATIONS

Translation of CN 101746755 (Year: 2010).*
Translation of KR 20130082277 A, (Year: 2013).*
Translation of CN 102874795 (Year: 2013).*
Translation of CN 102718993 (Year: 2012).*
Derwent abstract for CN 101746755 (Year: 2010).*
Derwent abstract for KR 20130082277 A, (Year: 2013).*
Derwent abstract for CN 102874795 (Year: 2013).*
Derwent abstract for CN 102718993 (Year: 2012).*
Search Report for Chinese Application 2015800324319, dated Feb. 5, 2018.
Folke, Johannes Tolle et al.; "Emulsifier-Free Graphene Dispersions with High Graphene Content for Printed Electronics and Freestanding Graphene Films"; Advanced Functional Materials, Wiley—VCH Verlag GmbH & Co. KGAA, DE, vol. 22, No. 6, Mar. 21, 2012, pp. 1136-1144.
Azoubel, S. et al.; "The formation of carbon nanotube dispersions by high pressure homogenization and their rapid characterization by analytical centrifuge"; Carbo, Elsevier, Oxford, GB, vol. 48, No. 12, Oct. 1, 2010, pp. 3346-3352.
Schluter, Bernadette, et al.; "Synthesis and Tribological Characterization of Stable Dispoersions of Terhmally Reduced Graphite Oxide"; Tribology Letters, Baltzer Science Publishers, NL, vol. 53, No. 1, Dec. 1, 2013, pp. 353-363.
Chatterjee, S., et al., "Mechanical reinforcement and thermal conductivity in expanded graphene nanoplatelets reinforced epoxy composites"; Chemical Physics Letters, vol. 531, Feb. 11, 2012, pp. 6-10.
International Search Report dated Nov. 11, 2015 for PCT Application No. PCT/EP2015/063397 filed Jun. 16, 2015.
Copy of Communication pursuant to Article 94(3) EPC dated Aug. 13, 2019 for European national phase application No. 15732564.8.
Van Der Pauw, L.J. A method of measuring specific resistivity and. Hail effect of discs of arbitrary shape Philips Research Reports 13, Feb. 1-9, 1958.

* cited by examiner

CONTINUOUS PROCESS FOR PREPARING PRISTINE GRAPHENE NANOPLATELETS

CROSS-REFERENCE TO RELATED APPLICATIONS

This application claims priority under 35 U.S.C. 371 to PCT/EP2015/063397, filed on Jun. 16, 2015, which in turn claims priority to Italian Application Serial No. MI2014A001124, filed on Jun. 20, 2014. The contents of each of these applications is incorporated by reference in their entirety for all purposes.

The present invention relates to a continuous process for preparing pristine graphene nanoplatelets.

Graphene is a material formed by a single atomic layer of $sp^2$ hybridized carbon atoms. These are arranged in hexagonal close-packed honeycomb structures that form the fundamental structural elements of graphite, of carbon nanotubes and of fullerenes.

Graphene is a material with unique properties: it is a zero band-gap semiconductor with high charge carrier mobility (up to 200,000 $cm^2/Vs$), very high mechanical strength (tensile strength ~40 N/m, Young's Modulus ~1.0 TPa), exceptional thermal conductivity (~5000 W/km) and high electric current carrying capacity (~1.2 mA/$\mu$m). These properties allow graphene to be used for applications in market segments that require the use of advanced materials. Therefore, graphene based materials are studied from a scientific and industrial point of view for applications in markets such as electronics, photovoltaics, batteries, sensors, optoelectronics and nanocomposites.

The term graphene "nanoplatelet" is intended as a substantially flat graphene particle, with a thickness (z) in the order of nanometers, typically less than 100 nm, and lateral sizes (x, y) greater than the thickness.

Scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of European patent EP 2 038 209 B1, which describes and claims, among other things, a method for producing structures comprising graphene layers, obtained by intercalation and subsequent expansion/exfoliation of graphite. US 2011/0017585 A1 describes the production of nano graphene platelets (NGPs) by means of ultrasonication of pure natural graphite dispersed in a liquid in the absence of surfactants. The liquid used must have a low surface tension, to ensure high wettability of the graphene. By studying the surface tension of many solvents it was found that the thickness of the nano graphene platelets obtained depended on the contact angle with the liquid, defined "solvent". All solvents used were organic solvents. The solvents used in the examples were n-heptane, glycerol and benzene. The description indicates the possibility of obtaining dispersions having a concentration of starting material (graphite) higher than 0.1 mg/mL, generally higher than 1 mg/mL, more frequently higher than 10 mg/mL (1% weight). The examples refer to dispersions having concentrations of 0.5% weight.

US 2008/0279756 A1 describes a method of producing exfoliated graphite, flexible graphite and nano graphene platelets (NGPs). The method comprises the dispersion of graphite particles or of graphite oxide in water followed by ultrasonication treatment at an energy level sufficient to generate platelets of nanometric dimension. The description (paragraph [0042]) refers to particles with lateral sizes lower than 100 nm. Example 5 describes ultrasonication treatment of an aqueous dispersion of NGPs at 2% by weight, in the presence of a surfactant, but does not indicate the dimensions of the NGPs obtained. Dispersions with graphene concentration higher than 2% are not described.

US 2011/0300056 by the same Applicant describes the production of nano-structures by a graphite intercalation and exfoliation treatment at high temperature in an inert plasma environment. The exfoliated graphite can pass directly into a liquid medium suitable to the end use of the exfoliated graphite.

WO 2009/106507 describes the preparation of graphite nanoplatelets with a process that comprises thermal plasma expansion of intercalated graphite followed by an exfoliation step carried out by means of ultrasonication, wet milling or controlled cavitation. The expanded graphite can be in the form of aqueous dispersion and in this case the presence of a surfactant, preferably a non-ionic surfactant, is required to compatibilize the graphite with the water. All the exfoliation techniques described, namely ultrasonication, wet milling and controlled cavitation, require the presence of a surfactant. The examples illustrate aqueous dispersions of graphite with a graphite/surfactant ratio of 1:1. Dispersions of the expanded graphite in organic solvents also require the presence of a surfactant. Exfoliation of the expanded graphite with the wet milling method is carried out with a bead mill.

US 2002/0054995A1 describes graphic platelet nano-structures obtained by treating standard graphite in a high pressure mill. The standard graphite can be treated in dry or wet state. In the case of wet treatment water can be used as the liquid dispersion medium, but the preferred liquid has a low boiling point (e.g. 50° C.), such as a perfluorocarbon.

Panagiotou, T; Bernard, J. M.; Mesite, S. V.; *NSTI-Nanotech* 2008, www.nsti.org, ISBN 978-1-4200-8503-7 Vol. 1, pp. 39-42, describe the deagglomeration and the dispersion of carbon nanotubes (CNT) using a high shear fluid processor for fluid treatment, named as the Microfluidizer® by Microfluidics Corp. (USA). The dispersion of CNT in water is also described, but at a very low concentration (1%).

Azoubel, S; Magdassi, S; CARBON 48 (2010); pp. 3346-3352, describe the formation of CNT dispersions using high pressure homogenization with the Microfluidizer® apparatus by Microfluidics Corp. (USA). Before the high pressure homogenization treatment, aqueous dispersions of the CNT are prepared at a very low concentration (0.1%) in the presence of a non-ionic surfactant (Triton X-100™) in an Ultra-Turrax® type homogenizer.

US 2014/0106153 A1 discloses a graphene platelet fabrication method comprising: a) providing a highly-graphitized graphene; and b) applying a shear force on the higly-graphitized graphene to separate it into a plurality of graphene platelets. The lateral size of these platelets is rather large, namely 10-500 $\mu$m. A pre-treatment to swell the higly-graphitized graphene may be required. The pre-treatment method is selected from the following methods: explosion, chemical exfoliation, ultrasonication, ball milling.

Tölle F. J. et al, "Emulsifier-Free Graphene Dispersions with High Graphene Content for Printed Electronics and Freestanding Graphene Films" *Adv. Funct. Mater.* 2012, 22, 1136-1144, describe dispersions of graphene oxide (GO) in water, with an oxygen content of from 4 to 16 wt %. When the oxygen content is 4 wt % or less, however, attempts to disperse thermally reduced GO in water failed. US 2013/0264041 A1 discloses a thermal management system containing an integrated graphene film for electronic devices.

Pristine graphene and graphene oxide (GO) are prepared by a process that includes expanding an intercalated graphite (IG) at a temperature of from 800 to 1050° C. for a time of from 15 seconds to 2 minutes. When pristine graphene is prepared (Example 3), graphite flakes are ground then subjected to ultrasonication. A water dispersion is formed containing 5 g of graphite in 1,000 mL of water and 0.1 wt % of a dispersing agent. Thus the amount of dispersing agent 1 g per 5 g of graphite, namely 20 wt % on the graphite content and on the resulting pristine graphene. The prior art methods for producing graphene nanostructures, including graphene nanoplatelets, have several drawbacks, such as obtaining graphene nanoplatelets at low outputs and/or with high energy consumption, or with too large size. Also, several prior art methods produce graphene oxide as opposed to pristine graphene. Aqueous dispersions of graphene oxide are easier to form than aqueous dispersions of pristine graphene, but the best properties of graphene are obtained when the amount of graphene oxide is minimum.

For example, due to the hydrophobic nature of graphene, the use of water as liquid process medium is avoided, and organic solvents are used; these are costly and problematic, both from the point of view of safety and from an environmental point of view. However, when water is used as dispersion medium, the presence of a surfactant is required, in order to guarantee the dispersion of the particles in the water and the stability of the dispersion thus obtained. However, the surfactant, or part thereof, deposits on the graphene nanostructures or nanoplatelets, making them less pure and reducing their electrical conductivity. Therefore, one of the most interesting properties of graphene is compromised.

Moreover, prior art processes use very dilute dispersions of graphene, which is inconvenient in order to obtain a dry end product or end product in the form of concentrated dispersion, as large volumes of dilute dispersion obtained from the production process must be treated. In fact, the majority of industrial applications of graphene mentioned above rely on the availability of graphene preferably in a form that is concentrated, easy-to-use, relatively inexpensive and safe from a health and environmental point of view.

Prior art processes are also characterized by low outputs and/or by high energy consumption. An object of the present invention is therefore to provide a continuous process for preparing pristine graphene, i.e. with a very high C/O ratio, minimum presence of reticular defects (detected using Raman spectroscopy) and minimum presence or absence of extraneous substances, including surfactants.

Another object of the invention is to provide a process that allows graphene nanoplatelets with very small sizes and with a very high aspect ratio to be obtained.

A further object of the invention is to provide a process that allows graphene nanoplatelets to be obtained in the form of a relatively concentrated dispersion, produced with a liquid medium that is readily available, inexpensive and very safe from a health and environmental point of view.

One more object of the invention is to provide a process for preparing pristine graphene nanoplatelets with low energy consumption and limited investment and management costs.

FIG. 11 is an illustration of a probe in a square configuration for use with the Van der Pauw Method. The aforesaid and other objects and advantages of the invention are achieved with a process for producing pristine graphene nanoplatelets having a C/O ratio ≥100:1, comprising the expansion of flakes of intercalated graphite having having a C/O ratio ≥100:1 and a lateral size ≤500 μm by exposing these flakes to a temperature from 1300 to 12000° C. for a time of less than 2 seconds, characterized in that:

a) the expanded graphite thus obtained is dispersed in water in the absence of a surfactant or in the presence of a surfactant in an amount of less than 1% by weight of said graphite;

b) the aqueous dispersion obtained in step a) is subjected to exfoliation and size reduction treatment carried out with one or more of the following methods:

b1) treatment with ultrasounds at an energy level of from 10 to 200 Wh per gram of said graphite;

b2) high pressure homogenization treatment carried out in a homogenizer, in which the expanded graphite dispersion is pumped at a pressure above 35 MPa through one or more micro-channels or necks having a section not greater than 500 μm, in which the particles of expanded graphite are caused to collide at an energy level from 5 to 200 Wh/g;

wherein said exfoliation treatment produces highly pure graphene having a C/O ratio ≥100:1 in the form of nanoplatelets, at least 90% of which have a lateral size (x, y) from 50 to 50,000 nm and a thickness (z) from 0.34 to 30 nm, the lateral size being greater than the thickness (x, y>z).

According to an aspect of the aforesaid process, the dispersion of graphite in water of step a) is carried out immediately after the step of expansion at high temperature by collecting the expanded graphite in water just after its formation.

According to a preferred embodiment, the process for producing pristine graphene is carried out in a continuous way by continuously feeding the graphite flakes to the high temperature expansion step, continuously discharging the so-obtained expanded graphite in an aqueous medium and continuously subjecting the expanded graphite dispersed in the aqueous medium to the exfoliation and size reduction treatment carried out with the aforesaid methods of ultrasonication (b1) and/or homogenization at high pressure (b2).

According to a preferred embodiment, the step of expansion at a temperature from 1300 to 12000° C. for a time of less than 2 seconds is carried out by means of an electric arch, or in a microwave or high frequency induction oven, or by forming plasma. This last treatment is particularly preferred as it is possible to reach the temperature required associated with high turbulence.

In the present description the size of the graphene nanoplatelets is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the graphene nanoplatelets are determined using laser diffractometry (Mastersizer 3000, Malvern Instruments). This type of analysis provides an indication of the population distribution referred to the lateral size of the graphene nanoplatelets.

The thickness (z) of the graphene nanoplatelets is determined with the atomic force microscope (AFM), which is essentially a profilometer with subnanometer resolution, widely used for characterization (mainly morphological) of the surfaces and of the nanomaterials. This type of analysis is commonly used (both for academic purposes and in industrial R&D) to evaluate the thickness of the graphene flakes, produced with any method, and to detect the number of layers forming the flake (single layer=0.34 nm).

The nanoplatelets of the final dispersion, deposited as described for SEM analysis, are scanned directly with an AFM tip, where the measurement provides a topographical image of the graphene flakes and their profile with respect to the substrate, enabling precise measurement of the thickness.

The final dispersion of the graphene nanoplatelets obtained after the exfoliation and size reduction treatment carried out with one or more of the methods b1) and b2) defined above can advantageously be concentrated or dried, depending on the final form required for the graphene.

In the final dispersion obtained with the process according to the invention, at least 90% of the graphene nanoplatelets preferably have a lateral size (x, y) from 100 to 35000 nm, more preferably from 500 to less than 10000 nm, and preferably a thickness (z) from 0.34 to 50 nm, more preferably from 0.34 to 12 nm, the lateral size being greater than the thickness (x, y>z). The amount of the size reduction of the graphene nanoplatelets is a function of the intensity and of the duration of the treatment according to methods b1) or b2), as also indicated in the examples that form part of the present description.

In the final dispersion according to the invention the C/O ratio in said graphene nanoplatelets is ≥100:1; preferably ≥200:1. This ratio is important as it defines the maximum amount of oxygen bonded to the carbon forming the graphene, i.e. of graphene oxide. It is in fact known that the best properties of graphene are obtained when the amount of graphene oxide is minimum. On the other hand, the polar character of the graphene oxide makes it more hydrophilic and therefore suitable for the formation of aqueous dispersions. One of the technical problems solved by the process according to the invention is therefore that of obtaining dispersions of graphene in water while maintaining the content of graphene oxide very low, as defined above.

The C/O ratio in the graphene of the dispersion according to the invention is determined by elementary analysis performed by Inductively Coupled Plasma Mass Spectrometry (ICP-MS), which provides the percentage by weight of the various elements. By normalizing the values obtained with respect to the atomic weight of the C and O species and finding their ratio, the C/O ratio is obtained. The reticular defects of the nanoplatelets can be evaluated using Raman spectroscopy by analyzing the intensity and shape of the Peak D positioned at 1350 cm$^{-1}$.

The use of graphene nanoplatelets is advantageous in many industrial applications, such as: use as additive or component of elastomeric compositions for tires, where it is advantageous to reach graphene levels of up to 15% by weight in order to achieve desired properties such as: i) an improved gas barrier effect, with consequent increase of impermeability, causing the tire to deflate more slowly; ii) improvement of the mechanical dynamic properties, in particular rolling resistance; iii) increase of thermal conductivity, useful for heat dissipation; iv) increase of electrical conductivity, useful for the dissipation of electrostatic energy;

use as additive or component of paints and silicone compositions, where it is advantageous to reach graphene levels of up to 20-30% by weight in order to achieve desired properties, such as: i) increase of thermal conductivity for heat dissipation, ii) increase of electrical conductivity, to reach conductive compounds; iii) gas and liquid barrier effect with consequent increase of impermeability, to give anticorrosion and antifouling properties;

use as additive or component in compositions for treating articles such as textiles, where it is advantageous to reach graphene levels of up to 40% by weight in order to achieve desired properties, such as: i) good electrical conductivity, for producing "intelligent" textiles; ii) good thermal conductivity; iii) liquid barrier effect; iv) flame retardant properties; v) EM and IR shielding.

In some applications, for example in the treatment of textiles, the direct use of suspensions of graphene in water is possible, as the preparation of a dispersion or suspension to apply to the textile is in any case required, according to various technical processes available to those skilled in the art.

The process for producing pristine graphene according to the invention comprises several steps.

The first step of the process consists in the preparation of expanded and/or exfoliated graphite starting from intercalated graphite.

The intercalated graphite can be prepared with methods known to those skilled in the art or purchased on the market. The expansion step of the intercalated graphite is performed by exposing flakes of intercalated graphite (Graphite Intercalation Compounds, GICs) having having a C/O ratio ≥100:1 and a lateral size ≤500 μm to a temperature from 1300 to 12000° C. for a time of less than 2 seconds. This treatment is performed as described in the patent EP 2038209 B1, i.e. by generating heat within the GICs, preferably using an electric arc, a microwave or high frequency induction furnace or by forming plasma. This last treatment is particularly preferred as it is possible to reach the temperature required associated with high turbulence. The expanded graphite obtained by the thermal treatment above still has a C/O ratio ≥100:1.

The second step of the process (step a) comprises collecting the expanded graphite obtained in the first step and dispersing it in an aqueous medium, just after its formation.

Preferably, the expanded graphite is transferred by gravity in a receptacle containing an aqueous medium in the absence of a surfactant or in the presence of a surfactant in an amount of less than 1% by weight of the weight of said graphite.

Contrary to the teachings of the prior art, it was surprisingly found that if the expanded graphite just formed is added to an aqueous medium, optimal dispersion can be obtained without requiring to use a surfactant. However, a small amount of surfactant, i.e. an amount of less than 1% by weight of the weight of the graphite, can be used.

Without being bound to any theory or explanation, it is believed that adding the expanded graphite to water just after its formation preserves a certain hydrophilic character, which is a useful condition for high compatibility with water and consequently for obtaining a good and stable dispersion. On the contrary, by leaving the expanded graphite just formed in contact with the air, this would cause adsorption of volatile organic compounds (VOC), which give the graphite a hydrophobic character, causing a decrease in its dispersibility in water.

Obtaining an excellent aqueous dispersion of expanded graphite without the aid of surfactants represents an important advantage of the process according to the invention, both due to the decrease in costs resulting from saving on surfactant, and due to the improved properties of the end product, as will be better explained in the description below. However, a small amount of surfactant, less than 1% by weight, can be used without any significant decrease in the quality of the end product.

If dispersion of the expanded graphite is carried out in the presence of a surfactant, the surfactant is preferably an anionic surfactant, more preferably an anionic surfactant in which the anion forming the hydrophilic polar group is selected from sulfonate, sulfate, carboxylate and the hydrophobic nonpolar part is selected from structures comprising aromatic rings such as benzene, naphthalene, pyrene or cyclic aliphatic structures such as derivatives of cholic acid. A particularly preferred surfactant is sodium benzenesulfonate.

The dispersion is obtained by light stirring.

The expanded graphite is dispersed in water at a concentration from 0.5% to 5% by weight, preferably from 1% to 4% by weight, more preferably from 2% to 3% by weight.

The third step of the process (step b) has the object of obtaining exfoliation and size reduction of the expanded graphite to obtain pristine graphene nanoplatelets, at least 90% of which have a lateral size (x, y) from 50 to 50,000 nm and a thickness (z) from 0.34 to 50 nm, the lateral size being greater than the thickness (x, y>z).

This exfoliation and size reduction is obtained by subjecting the dispersion of step a), therefore without surfactant or with an amount of surfactant of less than 1% by weight, to treatment with ultrasounds (b1) or to high pressure homogenization treatment in which the particles of expanded graphite (b2) are caused to collide at an energy level from 5 to 200 Wh/g, preferably from 7 to 80 Wh/g.

The treatment with ultrasounds (bp is carried out at an energy level of from 10 to 200 Wh per gram of expanded graphite obtained in the preceding step.

Preferably the treatment of the aqueous dispersion of expanded graphite with ultrasounds is performed at an energy level of from 10 to 100 Wh per gram. The treatment with ultrasounds is performed using apparatus such as commercial ultrasonicators for treating liquids, where the acoustic energy is transmitted to the system by cavitation (formation and explosion of bubbles) using a sonotrode immersed in the liquid, with wave frequency of around 24 kHz, and with power as defined above.

The combination of the expansion treatment of the intercalated graphite at high temperature and of the subsequent ultrasonication treatment in a water medium enables both an exfoliation of the graphite and a reduction in the size thereof to be performed, obtaining graphene nanoplatelets directly dispersed in water, in relatively rapid times.

The high pressure homogenization treatment (b2) is performed with a homogenizer in which the dispersion of expanded graphite is pumped at a pressure above 35 MPa through one or more micro-channels or necks. Here the particles in dispersion are subjected to very high shear stresses, deriving from the sudden pressure drop, and to collision with one another and with the surfaces of these micro-channels or necks. Preferably, the pressure at which the dispersion is pumped in the micro-channels or necks is from 100 to 500 MPa; more preferably from 150 to 500 MPa.

It must be specified that the term "neck" is intended as a reduction of the cross section of the duct substantially in one point through which the dispersion is forced to flow, while the term "micro-channel" is intended as a neck that extends in the direction of flow of the dispersion of particles.

This treatment allows a substantial size reduction of the expanded graphite to be obtained, up to the values according to the axes x, y and z mentioned previously. These necks can be of static type, such as flow channels having a maximum size of 500 μm, or of dynamic type, such as valves with a section that is adjustable so as to define a neck having a maximum size of 500 μm.

High pressure homogenization apparatus using necks of static type are marketed by Microfluidics International Corporation (Newton, Mass., U.S.A.) with the trade name Microfluidizer®. In these apparatus, the dispersion of expanded graphite is pumped at a pressure above 35 MPa through a plurality of flow channels having a maximum size of 500 μm, in which the particles of expanded graphite are caused to collide. Preferably, the maximum pressure is 500 MPa. The structure and the operation of this apparatus are also described, among other things, in the U.S. Pat. No. 8,367,004 B2.

High pressure homogenization apparatus using necks of dynamic type are marketed, among other things, by GEA NIRO-Soavi (Parma, Italy). The structure and the operation of these apparatus are also described, among other things, in the U.S. Pat. No. 4,773,833.

According to the amount of size reduction required, it is possible to treat the aqueous dispersion of expanded graphite several times in the homogenizer. This can be carried out in a continuous way, with various cycles through the homogenizer.

Preferably the high pressure homogenization treatment (b2) is performed in a homogenizer in which the dispersion of expanded graphite is pumped at a pressure above 100 MPa through one or more micro-channels or necks.

As mentioned previously, the final dispersion of the graphene nanoplatelets obtained after the exfoliation and size reduction treatment carried out with one or more of the methods b1) and b2) defined above can be concentrated or dried, depending on the final form required for the graphene.

Concentration of the dispersion can be carried out with techniques known to those skilled in the art, such as removal of the water by evaporation, filtration or centrifugation. The absence—or minimum presence (less than 1%)—of surfactant allows the problem of its possible polymerization to be avoided and makes it possible to operate with higher temperatures, as well as to guarantee the feasibility of liquid-solid separation.

Using the techniques indicated above, it is possible to increase the concentration of the dispersion up to 30% by weight. The product that is obtained in a range of concentrations from 6 to 30% by weight has a high viscosity and the consistency of a paste, and can advantageously be used as masterbatch for water-based formulations.

The advantages deriving from the use of a concentrated dispersion in the range from 6 to 30% by weight are: 1) freedom of formulation, i.e. the possibility to dilute the product to the desired concentration and to choose the best surfactant for the specific application; 2) high dispersibility due to the presence of residual water that, interposed between the graphene nanoplatelets, weakens the Van der Waals bonds that are established between them; 3) possibility to use the product directly by spreading on the desired substrate; 4) confinement of the graphene nanoplatelets in a matrix, facilitating their handling and transport.

A particularly advantageous method of concentrating the dispersion is that of filtration with removal of the water until obtaining a dispersion having a concentration in the desired range on the filter. The filtration system is controlled by adjusting on the treatment time and the filtration pressure. The filters are defined according to the surface area of the filter. A suitable filter system is one marketed with the trade name Funda® by Mavag AG.

The object of drying the dispersion is to obtain a dry powder that is easily redispersible in various matrices, both solvents and polymers, where liquid is not desirable or manageable at process level, or where water cannot be used due to chemical incompatibility.

The dispersion can be evaporated to dryness using prior art techniques, such as lyophilization, evaporation in a rotating evaporator or spray drying. In any case, the graphene nanoplatelets produced in the absence of a surfactant exhibit a high degree of dispersibility. Moreover, on the one hand the low oxygen content and the absence of reticular defects ensure high physical and chemical properties and on the other guarantee the permanent absence of stable re-agglomeration of the nanoplatelets, due to a chemical interaction of covalent type. The high aspect ratio (high lateral size and low thickness) ensures optimal performances in terms of electrical and thermal conductivity and barrier property.

A very important advantage of the process according to the invention consists in the possibility of operating without surfactant. In fact, the graphene nanoplatelets obtained with the process of the invention are highly pure, both due to the high C/O ratio and to the absence of extraneous substances that end up being contaminants, such as surfactants. In fact, it has been found that in the absence of surfactants it is possible to obtain graphene having substantially higher electrical conductivity than that of graphene obtained with prior art processes, i.e. in the presence of a surfactant. This improves the performance of the graphene in a plurality of applications.

More in particular, it has been found that pristine graphene nanoplatelets, at least 90% of which have a lateral size (x, y) from 50 to 50,000 nm and a thickness (z) from 0.34 to 50 nm, the lateral size being greater than the thickness (x, y>z), having a C:O ratio $\geq 100:1$, have a high electrical conductivity. The electrical conductivity is determined on a film obtained by depositing an aqueous dispersion of said nanoplatelets on a glass substrate forming a film of 1 cm×1 cm and drying the same by a heating plate at 100° C. for 15 minutes, and is measured in a Van der Pauw configuration. This film has an electrical conductivity $\geq 1500$ S/m, preferably $\geq 2000$ S/m.

It was also seen that when a dispersion of graphene nanoplatelets is formed in the presence of a surfactant, this deposits on the surface thereof and tends to promote its agglomeration.

To evaluate the effect of the presence of the surfactant in the powder on the degree of redispersibility both the graphene powders produced in the presence of a surfactant and those produced in the absence of a surfactant were redispersed in water and subjected to sonification in order to promote their deagglomeration. The dispersion thus obtained was deposited dropwise to analyze the morphology of the material thus obtained.

As indicated in the examples forming part of the present description, the comparison showed that while the graphene obtained with the process of the invention deagglomerates reproposing the single original nanoplatelets, which are perfectly distinguishable from one another and exhibit the same morphological properties as the precursor, in the case of a surfactant being present the powder is not efficiently deagglomerated and it can be seen that large agglomerates remain.

The process according to the invention enables dispersions of graphene in water having relatively high concentrations to be obtained, particularly in view of the fact that they are produced in the absence of a surfactant.

The availability of highly pure concentrated dispersions having up to 15% by weight of graphene nanoplatelets of very small size represents a substantial improvement compared to the prior art, both from the point of view of performance of the dispersion and of its processability.

From the point of view of performance, it was found that the fine particles of graphene of very small size interact optimally with the host matrix to which the dispersion is applied, whatever it be.

The invention will now be described by means of some embodiments provided purely by way of example.

Method of Measuring of the Electrical Conductivity

The electrical conductivity was determined on a film obtained by depositing an aqueous dispersion of graphene nanoplatelets on a glass substrate provided with a square cavity having a size of 1 cm×1 cm, so as to form a film of 1 cm×1 cm. The dispersion was then dried using a heating plate at 100° C. for 15 minutes. The thickness of the film so formed was measured via Scanning Electron Microscope (SEM). The electrical conductivity was then measured in a Van der Pauw configuration. The general method is described in the following paper: "A method of measuring specific resistivity and Hall effect of discs of arbitrary shape" van der Pauw, L. J. (1958). *Philips Research Reports* 13: 1-9, February 1958. The specific method is described below, with reference to FIG. 11.

Figure 11:
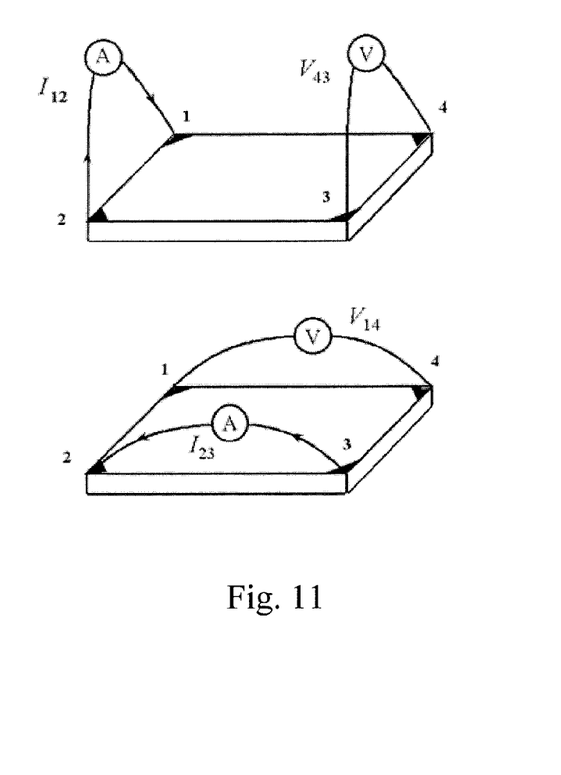

After the deposition of a square film of aqueous dispersion on a glass substrate, it was measured its sheet resistance, at the probe station, using the Van der Pauw Method. For this kind of measurements it was used a particular probe with four tips, in a square configuration, where is possible to have access (to give and to detect signal) at each tip (FIG. 11).

Van der Pauw has shown in the paper cited above that is possible to calculate the sheet resistance of an arbitrary shape samples determining the resistances along the vertical and horizontal edge ($R_{12,43}$ and $R_{23,14}$).

Therefore the probe was pressed on the film obtained from the dispersion, a current was applied along one edge ($I_{12}$) and the voltage across the other edge was measured ($V_{43}$) in order to find out the resistance of the edge ($R_{12,43}$), using the Ohm Law. To further improve the accuracy of the measurements it also determined the reciprocal resistances ($R_{43,12}$ and $R_{14,23}$) of $R_{12,43}$ and $R_{23,14}$. From the average of these two resistances it was possible to define $R_{vertical}$ and $R_{horizontal}$. On the same film at least 3 measurements were pertained in different points. After the electrical characterization, the film thickness was measured at the SEM. In this way, knowing $R_{vertical}$, $R_{horizontal}$ and the thickness of the film it was possible to derive the sheet resistance using the Van der Pauw formula.

EXAMPLE 1 (COMPARISON)

Figure 1:
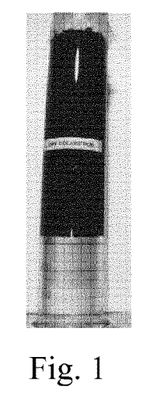
FIG. 1 is an image of expanded graphite located at the interface with liquid during the preparation of an aqueous dispersion of expanded graphite.
Figure 1A:
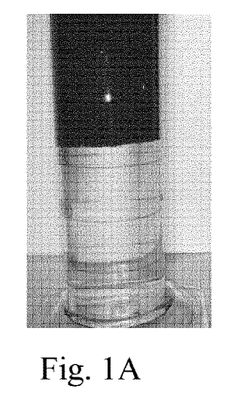
FIG. 1A is a close-up image of expanded graphite located at the interface with liquid during the preparation of an aqueous dispersion of expanded graphite.

Preparation of an Aqueous Dispersion of Expanded Graphite 10 g of grade ES 250 F5 commercially available intercalated graphite (hereinafter IG), marketed by Graphit Kropfmühl AG, having a lateral size of around 300 µm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1. The expanded graphite produced was stored in plastic bags for a period of 7 days, thus coming into contact with ambient air. The expanded graphite was then dispersed in 1000 mL of deionized water in the absence of a surfactant. Due to the hydrophobic nature of the EG and to the surface contamination by volatile organic compounds (VOC) through exposure to air, the expanded graphite was located at the interface with the liquid, remaining completely separated therefrom, as can be seen in FIGS. 1 and 1A, this latter being an enlargement of FIG. 1

Figure 2:
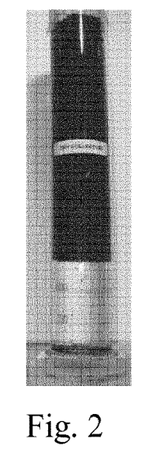
FIG. 2 is an image of the same dispersion of graphite of FIG. 1 after a period of around one month.
Figure 2A:
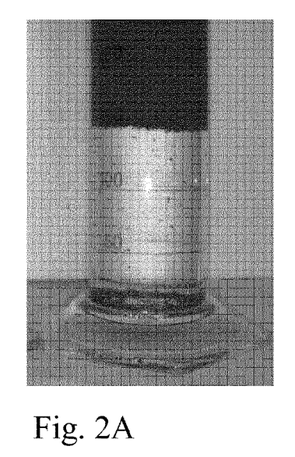
FIG. 2A is a close-up image of the same dispersion of graphite of FIG. 1 after a period of around one month.

The same dispersion was maintained under observation for a period of around one month. After 30 days it appeared as shown in FIGS. 2 and 2A, this latter being an enlargement of FIG. 2. It can be noted that only a negligible amount of EG is deposited at the bottom of the receptacle, while it has remained almost entirely above the surface of the water.

EXAMPLE 2

Figure 3:
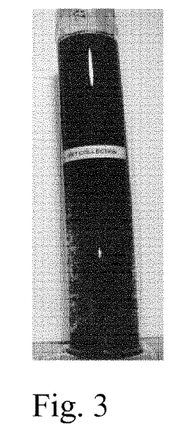
FIG. 3 is an image of expanded graphite following plasma thermal treatment and without being allowed to come into contact with volatile organic contaminants present in the air.
Figure 3A:
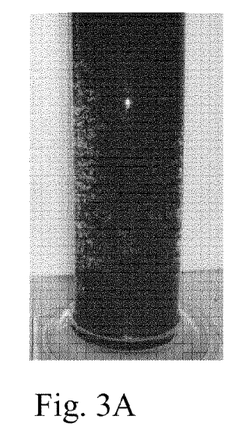
FIG. 3A is a close-up image of expanded graphite following plasma thermal treatment and without being allowed to come into contact with volatile organic contaminants present in the air.

Preparation of an Aqueous Dispersion of Expanded Graphite 10 g of grade ES 250 F5 commercially available intercalated graphite (hereinafter IG), marketed by Graphit Kropfmühl AG, having a lateral size of around 300 µm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1. The expanded graphite, after being withdrawn from the plasma, was collected directly in 1000 mL of deionized water in the absence of a surfactant, without coming into contact with ambient air. The expanded graphite, following plasma thermal treatment and without being allowed to come into contact with volatile organic contaminants (VOC) present in the air, exhibited a less hydrophobic behavior compared to the case of Example 1, as the EG is distributed throughout the volume of the liquid, as shown in FIGS. 3 and 3A.

Figure 4:
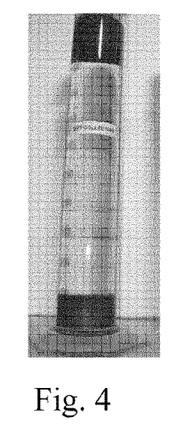
FIG. 4 is an image of expanded graphite of FIG. 3 after a period of around one month.
Figure 4A:
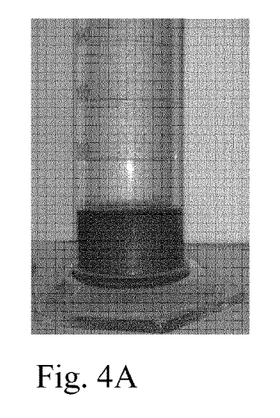
FIG. 4A is a close-up image of the expanded graphite of FIG. 3 after a period of around one month.

The same dispersion was maintained under observation for a period of around one month. After 30 days it appeared as shown in FIGS. 4 and 4A, i.e. around half of the expanded graphite is deposited on the bottom of the receptacle, while the other half is accumulated under the surface of the water.

EXAMPLE 3

Preparation of Graphene Nanoplatelets 30 g of grade ES 250 F5 commercially available intercalated graphite (hereinafter IG), marketed by Graphit Kropfmühl AG, having a lateral size of around 300 µm, were expanded by insertion into an induction plasma with the following characteristics:
Type of gas for Plasma/Auxiliary/Carrier feed: Argon
Feed speed (IG): 50 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1.

Figure 5:
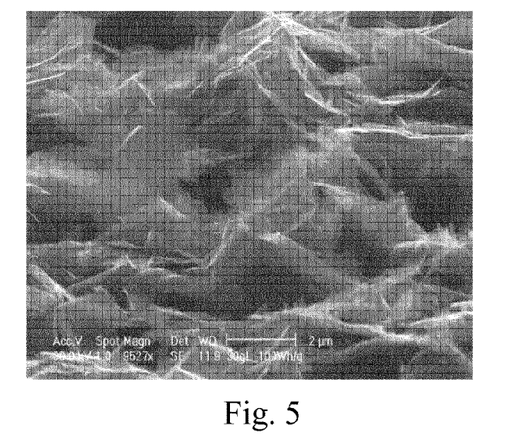
FIG. 5 is an image of graphene nanoplatelets.

The expanded graphite, after being withdrawn from the plasma, was collected directly in 1000 mL of deionized water in the absence of a surfactant. The dispersion thus obtained, at the concentration of 30 g/L, was subjected to ultrasonication treatment for a period of 8 hours at a power of 400 W (UIP400S, Hielscher) in order to exfoliate the expanded graphite and reduce its lateral sizes, obtaining graphene nanoplatelets characterized by a lateral size of less than 30 µm and a thickness of less than 10 nm, as shown in the image obtained with the electron microscope of FIG. 5.

The particle size of the graphene nanoplatelets was evaluated using laser diffractometry (Mastersizer 3000, Malvern Instruments), providing the values indicated in Table 1 below. This type of analysis provides an indication of the population distribution referred to the lateral size of the graphene nanoplatelets and is relative to a given energy treatment. The values D90, D50 and D10 indicated respectively that 90%, 50% and 10% of the nanoplatelets have a lateral size below the respective value indicated in the table.

TABLE 1

| Sample | D10 (µm) | D50 (µm) | D90 (µm) |
|---|---|---|---|
| 30 g/L | 0.987 | 3.44 | 11 |

In order to analyze the morphology of the graphene nanoplatelets in detail, the dispersion was diluted in deionized water in a ratio of 1:100 and was then deposited on a silicon oxide substrate, placed on a heating plate at 100° C. The substrate was analyzed with scanning electron microscopy (SEM), indicating a average lateral size of the graphene nanoplatelets in the range [0.5÷15]µm, and a thickness in the range [0.34÷10] nm.

Figure 6:
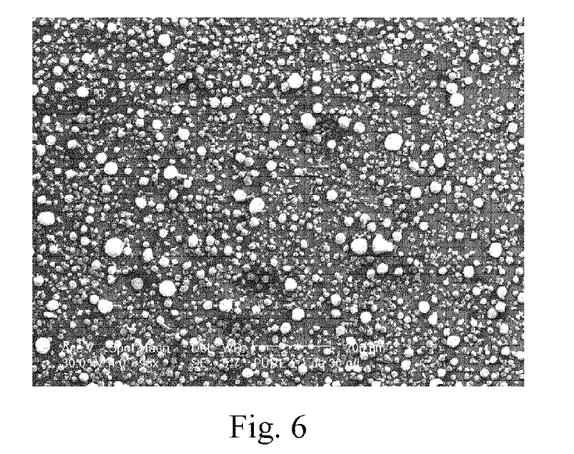
FIG. 6 is an image of spherules of graphene nanoplatelets.
Figure 6A:
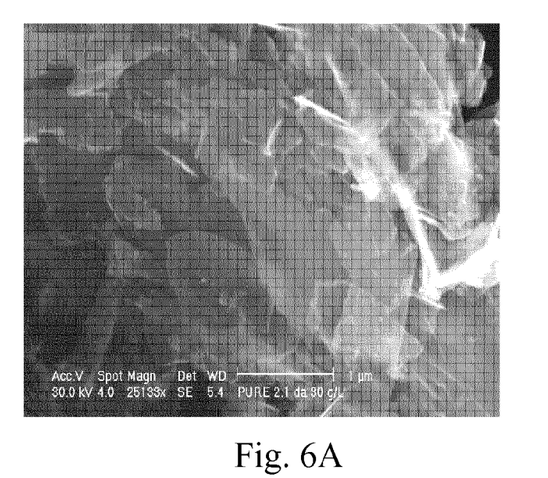
FIG. 6A is a close-up image of spherules of graphene nanoplatelets.

The dispersion was then dried using a spray-dryer (Niro, Niro Production Minor), operating with the following parameters:
Feed speed: 15 l/h
Inlet temperature: 400° C.
Outlet temperature: 120° C.
Nebulization pressure: 2.5 bar An anhydrous powder was obtained with an apparent density of around 60 g/L, consisting of spherules of graphene nanoplatelets, shown in FIGS. 6 and 6A, in which the scale indicators are respectively 200 µm and 1 µm.

EXAMPLE 4 (COMPARISON)

Preparation of Graphene Nanoplatelets 30 g of grade ES 250 F5 commercially available intercalated graphite (hereinafter IG), marketed by Graphit Kropfmühl AG, having a lateral size of around 300 µm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1.

Figure 7:
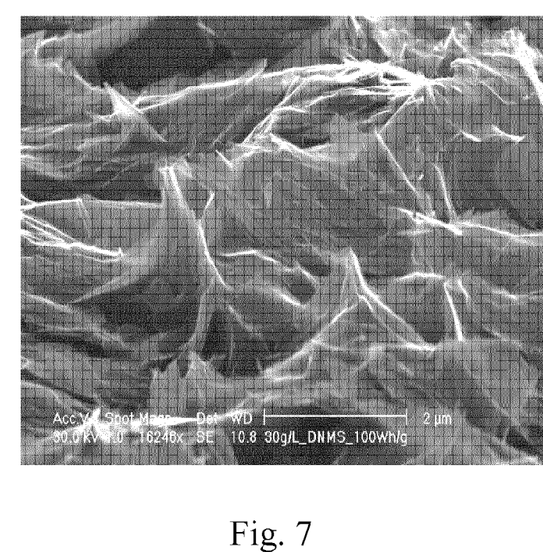
FIG. 7 is a further image of graphene nanoplatelets with a lateral size of less than 30 μm and a thickness of less than 10 nm.

The expanded graphite, after being withdrawn from the plasma, was collected directly in 1000 mL of deionized water in the presence of a surfactant, in particular sulfonated naphthalene at the concentration of 3 g/L. The dispersion having the concentration of 30 g/L thus obtained was subjected to ultrasonication treatment for a period of 8 hours at a power of 400 W (UIP400S, Hielscher) in order to exfoliate the expanded graphite and reduce its lateral sizes, obtaining graphene nanoplatelets characterized by a lateral size of less than 30 µm and a thickness of less than 10 nm (FIG. 7).

The particle size of the graphene nanoplatelets was evaluated using laser diffractometry (Mastersizer 3000, Malvern Instruments), providing the values indicated in Table 2.

TABLE 2

| Sample | D10 (µm) | D50 (µm) | D90 (µm) |
|---|---|---|---|
| 30 g/L with surfactant | 0.830 | 2.95 | 9.99 |

In order to analyze the morphology of the graphene nanoplatelets in detail, the dispersion was diluted in deionized water in a ratio of 1:100 and was then deposited on a silicon oxide substrate, placed on a heated plate at 100° C. The substrate was analyzed with scanning electron microscopy (SEM), indicating an average lateral size of the graphene nanoplatelets in the range [0.5÷15]µm, and a thickness in the range [0.34÷10] nm.

Figure 8:
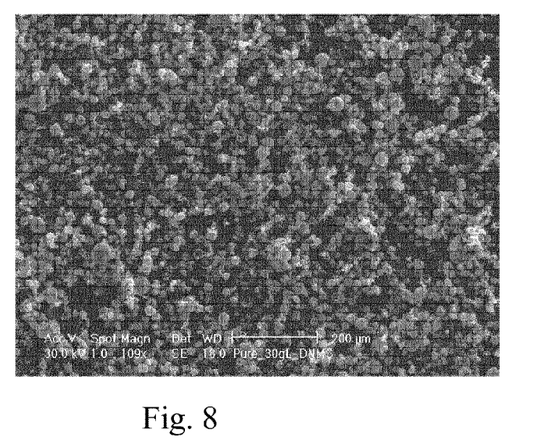
FIG. 8 is an image of spherules of graphene nanoplatelets and dispersant.
Figure 8A:
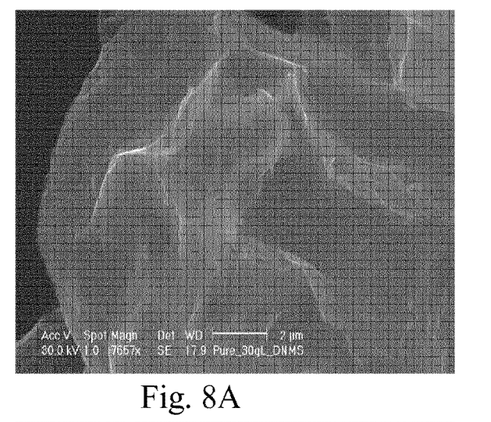
FIG. 8A is a close-up image of spherules of graphene nanoplatelets and dispersant.

The dispersion was then dried using a spray-dryer (Niro, Niro Production Minor), operating with the following parameters:
Feed speed: 15 l/h
Inlet temperature: 400° C.
Outlet temperature: 120° C.
Nebulization pressure: 2.5 bar
obtaining an anhydrous powder having an apparent density of around 240 g/L, consisting of spherules of graphene nanoplatelets and dispersant (FIGS. 8 and 8A), in which the scale indicators are respectively 200 µm and 2 µm.

EXAMPLE 5

The dispersion of graphene nanoplatelets in water obtained as in Example 3, i.e. 30 g/L in the absence of a surfactant, was deposited on a glass substrate forming a film of 1 cm×1 cm and dried using a heating plate at 100° C. for 15 minutes. The film thickness was evaluated using electron microscopy as 14 µm. The electrical conductivity of the film was measured in a Van der Pauw configuration according to the method described above, providing a value of 2141 S/m.

EXAMPLE 6 (COMPARISON)

The dispersion of graphene nanoplatelets in water obtained as in Example 4, i.e. 30 g/L in the presence of a surfactant, was deposited on a glass substrate forming a film of 1 cm×1 cm and dried using a heating plate at 100° C. for 15 minutes. The film thickness was evaluated using electron microscopy as 22 µm. The electrical conductivity of the film was measured in a Van der Pauw configuration providing a value of 1165 S/m.

EXAMPLE 7

Figure 9:
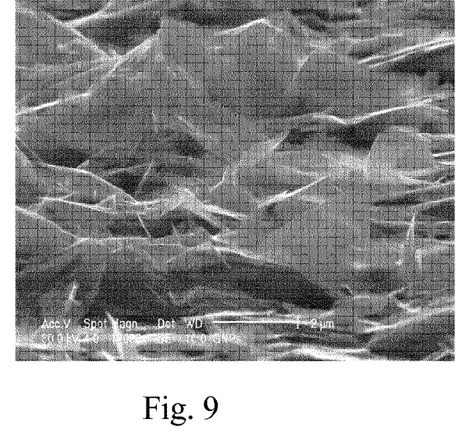
FIG. 9 is an image of a dispersion of graphene nanoplatelets on a silicon oxide substrate.

The powder of graphene nanoplatelets obtained as in example 3 (apparent density 60 g/L, absence of a surfactant) was dispersed in deionized water at the concentration of 1 g/L in the absence of a surfactant and subjected to sonication in an ultrasound bath (Elma Transsonic Digital D78224, 40 kHz) at a power of 40 W for 15 minutes. The dispersion was deposited on a silicon oxide substrate and analyzed using electron microscopy; it could be observed that the powder had been completely disaggregated in the single graphene nanoplatelets (FIG. 9).

EXAMPLE 8 (COMPARISON)

Figure 10:
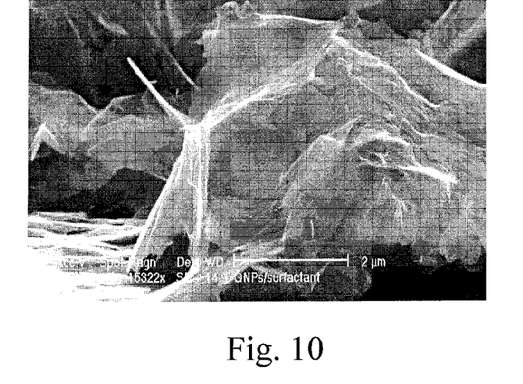
FIG. 10 is an image of graphene nanoplatelets obtained in Example 4 dispersed and deposited on a silicon oxide substrate.

The powder of graphene nanoplatelets obtained as in example 4 (apparent density 240 g/L, presence of a surfactant) was dispersed in deionized water at the concentration of 1 g/L in the absence of a surfactant and subjected to sonication in an ultrasound bath (Elma Transsonic Digital D78224, 40 kHz) at the power of 40 W for 15 minutes. The dispersion was deposited on a silicon oxide substrate and analyzed using electron microscopy. It can be observed that the powder has not been completely disaggregated in the single graphene nanoplatelets (FIG. 10).

EXAMPLE 9

Preparation of Graphene Nanoplatelets
20 g of grade ES 250 F5 commercially available intercalated graphite (hereinafter IG), marketed by Graphit Kropfmühl AG, having a lateral size of around 300 μm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected directly in 1000 mL of deionized water in the absence of a surfactant. The dispersion of EG thus obtained was subjected to an exfoliation and crushing treatment using a high pressure homogenizer (model M110P, Microfluidics Corp.), also called microfluidizer, in order to exfoliate the expanded graphite and to reduce its lateral sizes, obtaining graphene nanoplatelets characterized by a lateral size of less than 30 μm and a thickness of less than 10 nm. The dispersion was fed through the homogenizer for a total of 7 cycles operating at a pressure of 200 MPa and receiving an energy input of 47 Wh/g.

The effects of the exfoliation treatment and size reduction of the graphene nanoplatelets were analyzed using laser diffractometry (Mastersizer 3000, Malvern Instruments). This type of analysis provides an indication of the population distribution referred to the lateral size of the graphene nanoplatelets.

Table 3 compares the particle size values of a dispersion 20 g/L of EG collected in water in the absence of a surfactant, the same dispersion subjected to 1 and 7 homogenization cycles operating at a pressure of 200 MPa receiving an energy input of 7 Whig and 47 Whig respectively, in order to evaluate the effects of the two energy treatments being compared.

TABLE 3

| Sample | D10 (μm) | D50 (μm) | D90 (μm) |
|---|---|---|---|
| 20 g/L collected in water | 12.86 | 43.57 | 130.91 |
| 1 homogenizer cycle 7 Wh/g | 3.35 | 8.39 | 24.25 |
| 7 homogenizer cycles 47 Wh/g | 1.57 | 3.32 | 6.48 |

The data show the efficacious effect of exfoliation and size reduction of the expanded graphite obtaining graphene nanoplatelets of very small sizes.

EXAMPLE 10

Preparation of Graphene Nanoplatelets 40 g of grade ES 250 F5 commercially available intercalated graphite (hereinafter IG), marketed by Graphit Kropfmühl AG, having a lateral size of around 300 μm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1. The expanded graphite, after being withdrawn from the plasma, was collected directly in 1000 mL of deionized water in the absence of a surfactant. The dispersion of EG thus obtained was subjected to exfoliation and crushing treatment using a homogenizer (PandaPLUS 2000, GEA Niro Soavi) in order to exfoliate the expanded graphite and to reduce its lateral sizes, obtaining graphene nanoplatelets characterized by a lateral size of less than 30 μm and a thickness of less than 10 nm. The dispersion was fed through the homogenizer for a total of 6 cycles, operating at a pressure of 150 MPa.

The effects of the energy treatment on the particle size of the graphene nanoplatelets were analyzed using laser diffractometry (Mastersizer 3000, Malvern Instruments). This type of analysis provides an indication of the population distribution referred to the lateral size of the graphene nanoplatelets, and is relative to a given energy treatment. Table 4 indicates the particle size values of a dispersion 40 g/L of EG collected in water in the absence of a surfactant after the homogenization treatment.

TABLE 4

| Sample | D10 (μm) | D50 (μm) | D90 (μm) |
|---|---|---|---|
| 40 g/L_6 cycles | 2.14 | 5.74 | 10.33 |

EXAMPLE 11

Concentration of the Dispersion of Graphene 1 liter of dispersion of graphene nanoplatelets in water obtained as in Example 3, i.e. having the concentration of 30 g/L in the absence of a surfactant, is subjected to concentration using a filter system (Mavag AG, Funda® Filter, filter size=0.15 m²) for 13 minutes at a pressure of 1 bar, reaching a final concentration of 150 g/L and the viscosity of a paste.

The invention claimed is:

1. A process for producing pristine graphene nanoplatelets having a C/O ratio ≥100:1, comprising:
   a) expanding flakes of intercalated graphite having a C/O ratio ≥100:1 and a lateral size of ≤500 μm by exposing the flakes to a temperature from 1300 to 12000° C. for a time of less than 2 seconds, and obtaining an expanded graphite having a C/O ratio ≥100:1;
   aa) dispersing the obtained expanded graphite having a C/O ratio ≥100:1 in water in the absence of organic solvent and in the absence of a surfactant or in the presence of a surfactant in an amount of less than 1% by weight of the weight of the graphite; and
   b) subjecting said aqueous dispersion obtained in procedure (aa) to an exfoliation and a size reduction treatment carried out according to at least one of the following procedures:
      b1) treatment with ultrasound at an energy level of from 10 to 200 Wh per gram of the graphite, or
      b2) treatment with high pressure homogenization carried out in a homogenizer in which the dispersion of graphite is pumped at a pressure above 35 MPa through one or more micro-channels or necks having a section not greater than 500 μm, in which the particles of the expanded graphite are caused to collide at an energy level from 5 to 200 Wh/g;

wherein the exfoliation and the size reduction treatment produces pristine graphene having a C/O ratio ≥100:1 in the form of nanoplatelets, at least 90% of which have a lateral size (x, y) from 50 to 50,000 nm and a thickness (z) from 0.34 to 50 nm, the lateral size being greater than the thickness (x, y>z), and wherein the dispersing of the expanded graphite in water of in procedure (aa) is carried out immediately after the procedure of the expansion of the flakes at the temperature from 1300 to 12000° C. by collecting the expanded graphite in water just after a formation of the expanded graphite.

2. The process of claim 1, wherein the dispersion of the expanded graphite in water of procedure (aa) is carried out in a continuous way by continuously feeding the flakes of intercalated graphite to the expansion step at the temperature from 1300 to 12000° C., continuously discharging the so-obtained expanded graphite in said aqueous medium, and continuously subjecting the expanded graphite dispersed in the aqueous medium to an exfoliation and a size reduction treatment carried out according to at least one of procedure (b1) or procedure (b2).

3. The process of claim 1, wherein the procedure of expansion at the temperature from 1300 to 12000° C. for a time of less than 2 seconds is carried out using an electric arch, a microwave or high frequency induction oven, or by forming plasma.

4. The process of claim 1, wherein (b2) is carried out in a homogenizer in which the dispersion of the expanded graphite is pumped at a pressure above 100 MPa through one or more necks having a section not greater than 500 μm.

5. The process of claim 1, further comprising concentrating or drying of the aqueous dispersion obtained after the treatment of exfoliation or size reduction according to at least one of procedure (b1) or procedure (b2).

6. The process of claim 5, wherein the concentration procedure is carried out until a dispersion of the pristine graphene nanoplatelets is obtained at a final concentration from 6 to 30 wt. %.

7. The process of claim 5, wherein the concentration procedure is carried out by filtration, evaporation, or centrifugation.

* * * * *